United States Patent [19]

Beggs et al.

[11] Patent Number: 4,926,170

[45] Date of Patent: May 15, 1990

[54] OBJECT DETECTION METHOD AND APPARATUS EMPLOYING ELECTRO-OPTICS

[75] Inventors: George Beggs, Boulder; Richard Speck, Denver, both of Colo.

[73] Assignee: Auto-Sense, Ltd., Englewood, Colo.

[21] Appl. No.: 13,812

[22] Filed: Feb. 12, 1987

Related U.S. Application Data

[63] Continuation-in-part of Ser. No. 831,016, Feb. 19, 1986, Pat. No. 4,766,421.

[51] Int. Cl.[5] .............................................. G08G 1/16
[52] U.S. Cl. .................................... 340/904; 180/169; 340/903
[58] Field of Search ............................. 340/901-904, 340/933, 942, 97, 555-557; 180/169; 342/455, 27, 28; 356/438, 439

[56] References Cited

U.S. PATENT DOCUMENTS

| | | | |
|---|---|---|---|
| 2,896,089 | 7/1959 | Wesch | 340/903 |
| 3,444,544 | 5/1969 | Pearson et al. | 340/555 |
| 3,749,918 | 7/1973 | Jones | 340/904 |
| 3,891,966 | 6/1975 | Sztankay | 340/903 |
| 3,892,483 | 7/1975 | Säufferer | 340/903 |
| 4,026,654 | 5/1977 | Beaurain | 340/903 |
| 4,382,291 | 5/1983 | Nakauchi | 340/555 |
| 4,383,238 | 5/1983 | Endo | 340/901 |
| 4,447,800 | 5/1984 | Kasuya et al. | 340/901 |
| 4,582,279 | 4/1986 | Pontier | 340/933 |
| 4,626,849 | 12/1986 | Sims | 340/901 |
| 4,656,462 | 4/1987 | Araki et al. | 340/557 |
| 4,757,450 | 7/1988 | Etoh | 340/904 |
| 4,760,381 | 7/1988 | Haag | 340/556 |
| 4,766,421 | 8/1988 | Beggs et al. | 340/904 |

Primary Examiner—Joseph A. Orsino
Assistant Examiner—Brent A. Swarthout
Attorney, Agent, or Firm—Dykema Gossett

[57] ABSTRACT

Apparatus for detecting the presence of an object within an area under surveillance employs an electro-optical emitter for directing light into the area and an electro-optical receiver for sensing light reflected from the object which originates from the emitter. The emitter emits light energy of a preselected wavelength and is modulated at a preselected frequency to provide the emanating light energy with a characteristic signature. Light reflected by an object within the area under surveillance is filtered and converted to an electrical signal which varies in accordance with the magnitude of the filtered light having the preselected wavelength and modulation frequency. A selected portion of the electrical signal is amplified by a band-pass amplifier and is synchronously sampled in accordance with the modulation frequency to determine the magnitude of the filtered light which originated from the emitter. The sampled signal is compared with a threshold value to determine whether an object is present within the area under surveillance. The emitter and receiver are covered by a transparent shield to protect them against foreign matter. An electro-optic detector monitors the accumulation of foreign particulates on the shield. The apparatus may be desirably used in vehicles to detect the presence of adjacent objects, particularly within the vehicle's "blind spots" and thereby avoid collisions.

21 Claims, 7 Drawing Sheets

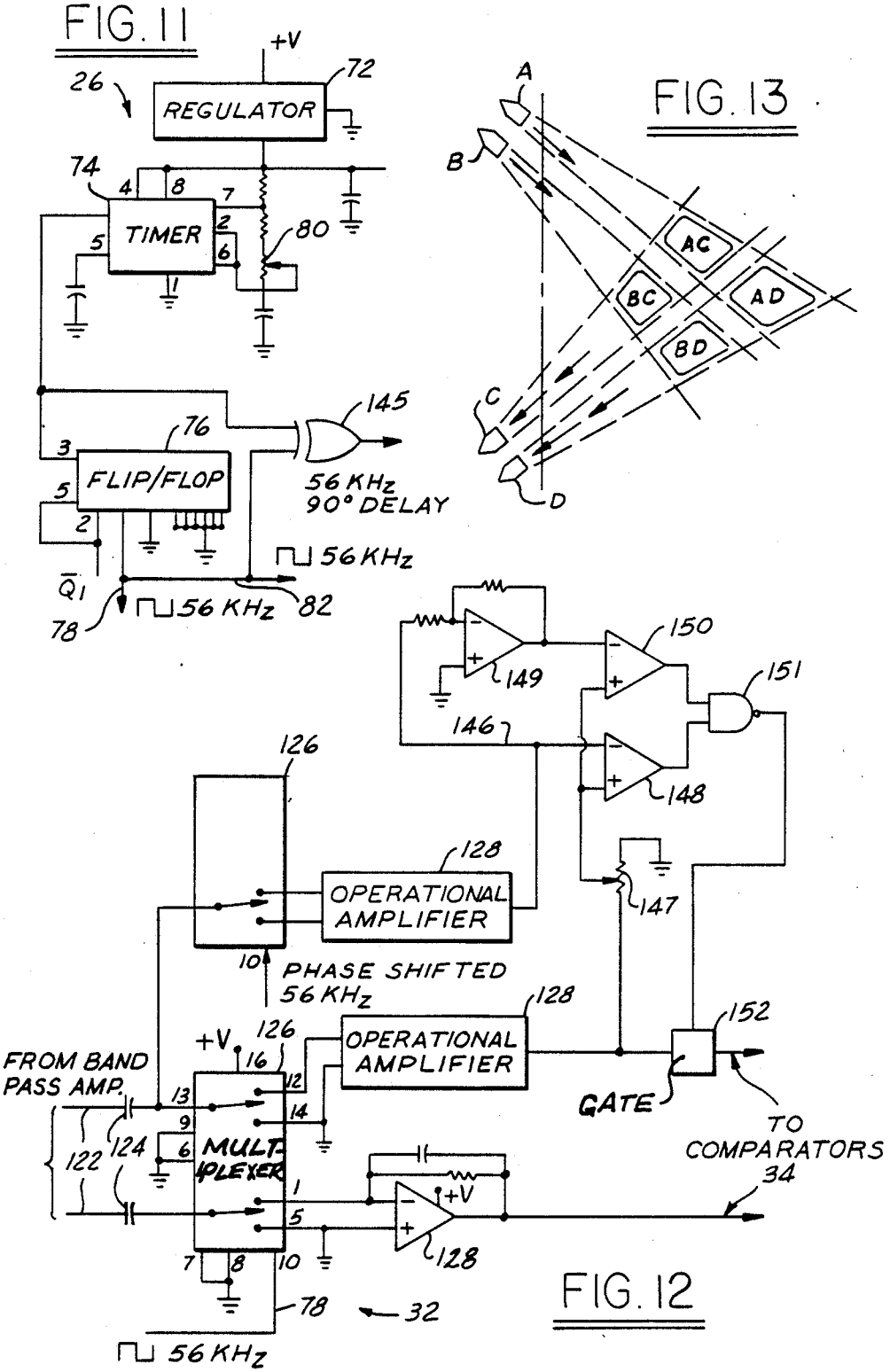

OBJECT DETECTION METHOD AND APPARATUS EMPLOYING ELECTRO-OPTICS

This application is a continuation-in-part of Ser. No. 831,016, which was filed on Feb. 19, 1986, now U.S. Pat. No. 4,766,421.

TECHNICAL FIELD

The present invention broadly relates to systems for detecting the presence of an object within an area or areas under surveillance, and deals more particularly with a detection system which employs electro-optics to sense the presence of the object, and is particularly well-suited for use by vehicles to avoid collisions.

BACKGROUND ART

Various types of systems have been devised in the past for use in detecting the presence of an object within an area or space under surveillance. Many of these systems find particular application in vehicles for the purpose of alerting the driver of the presence of adjacent objects and cars. The systems employed in vehicle applications are sometimes referred to as collision avoidance systems.

Numerous types of differing technologies have been employed in previous collision avoidance systems. For example, one known type of system is based on ultrasonics. A high frequency sound wave is emitted into the area under surveillance and reflected sound waves having the frequency of the emitted sound are analyzed to determine whether an object is present in the monitored area. Ultrasonic-type systems are rather slow in terms of response time and are particularly subject to various kinds of interference due to wind buffeting and eddies as well as other sources of interfering noise which reduces the reliability of the systems. Moreover, the ultrasonic transducer employed in these systems must be mounted in the open air, thus subjecting it to airborne dirt and moisture which can eventually interfere with the proper operation of the system.

Another type of known collision avoidance system uses radio frequency transmitters and receivers or radars. These latter-mentioned systems, while relatively effective in terms of performance, are relatively expensive and therefore have not gained widespread use in common passenger vehicles.

Optical systems are also known which measure the time of flight for light transmitted from the vehicle, to the object and back. However, these systems also require expensive components and relatively complex circuitry.

Accordingly, there is a need in the art for a low cost, relatively simple device for detecting the presence of an object within an area under surveillance which may be employed, for example, in vehicles to avoid collisions.

SUMMARY OF THE INVENTION

In accordance with the present invention, apparatus is provided for detecting the presence of an object within an area under surveillance which employs an electro-optical emitter and receiver which are relatively simple in design and inexpensive to manufacture, but yet which are highly effective and not subject to reliability problems due to interference. The emitter emits light energy which is modulated with a preselected frequency spectrum to provide the emitted light energy with a a characteristic signature. Light within the area under surveillance is received by a receiver which is mounted adjacent the emitter. The receiver includes a filter for passing only a portion of the received light energy from the object which possesses a band of preselected wavelengths. A photosensitive semiconductor device converts the filtered light into an electrical signal which varies in accordance with the magnitude of filtered light. This electrical signal is amplified by a bandpass amplifier which amplifies selected frequencies in the signal and the amplified signal is then synchronously detected in accordance with the modulation frequency spectrum to determine the magnitude of filtered light which possesses the characteristic signature that is reflected from the object. The synchronously derived signal is compared with a threshold value to determine whether an object is present within the area under surveillance. The presence of an object or another vehicle within the area of surveillance is announced to the driver by way of an audible and/or visual signal.

The preselected frequency spectrum is keyed in a manner which will prevent interference between similar systems on other nearby vehicles. The frequency spectrum preferably varies over time in a unique fashion and can also contain a plurality of component frequencies. Synchronous detection insures that the apparatus only responds to a signal having the unique modulation key.

In one preferred embodiment, the electrical signal is, in addition, synchronously detected at a 90° phase delay. The result of phase delayed detection is an indication of either interference from other systems or of a distance to the object being greater than the area of interest due to its long time-of-flight.

In another preferred embodiment, the locations of objects in several zones are detected by employing emitters with annularly separated beams. Each beam is given some unique characteristic to allow a detector to distinguish among the beams. The emitted beams may be given unique modulation frequency spectra or alternatively may be emitted in a time multiplexed sequence. The number of zones can be increased by employing a plurality of detectors each monitoring a different zone.

BRIEF DESCRIPTION OF THE DRAWINGS

In the drawings, which form an integral part of the specification and are to be read in conjunction therewith, and in which like reference numerals are employed to designate identical components in the various views:

FIG. 11 is a schematic diagram showing a modification to the controller of FIG. 5;

FIG. 12 is a schematic diagram showing a modification to the synchronous detector circuit of FIG. 9; and FIG. 13 is a diagram showing zonal detection in a further embodiment of the present invention.

DESCRIPTION OF THE PREFERRED EMBODIMENTS

The present invention broadly relates to apparatus for detecting the presence of an object within an area under surveillance which employs an electro-optical system for detecting the presence of the object. The detection apparatus of the present invention may be used advantageously in a variety of applications such as security monitoring, collision avoidance systems, etc. For illustrative purposes, however, the detection apparatus of the present invention will be described in detail in connection with a collision avoidance system for vehicles.

Figure 1:
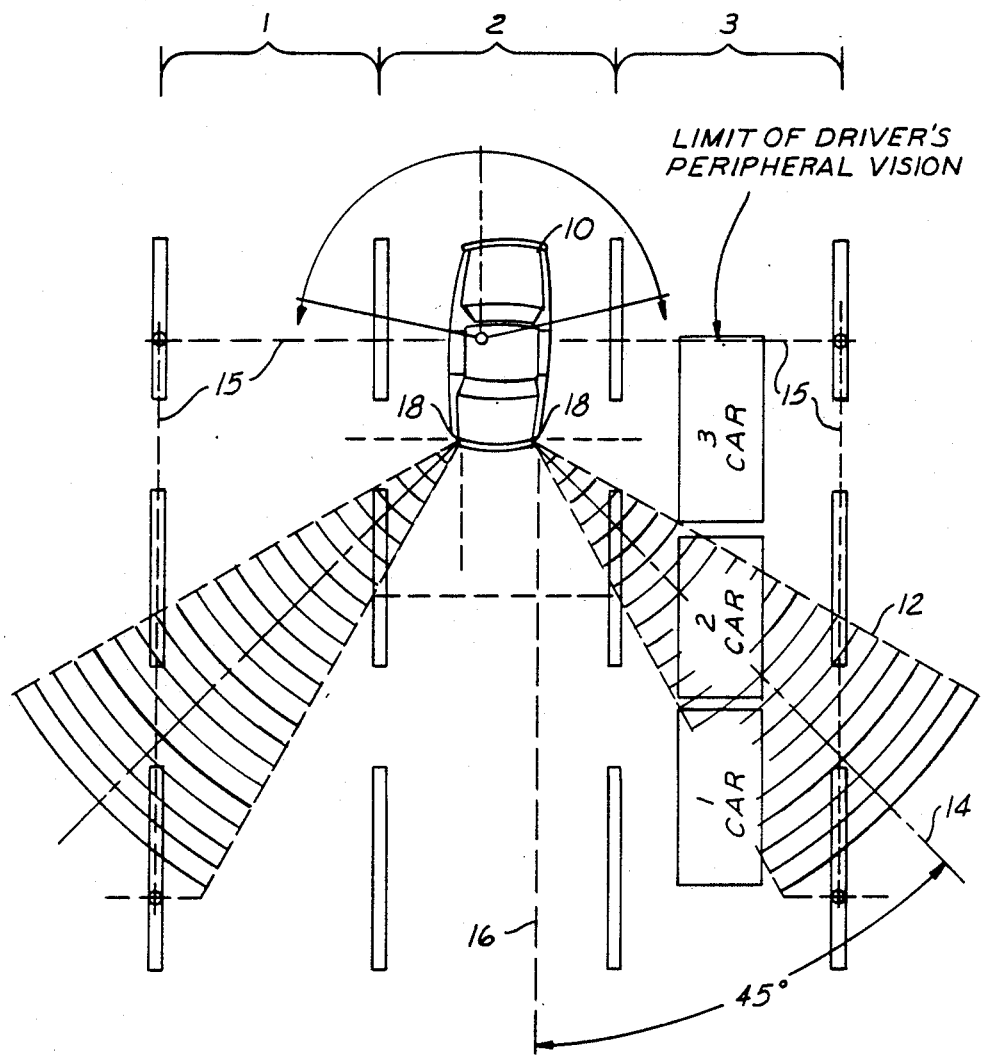
FIG. 1 is a plan view of a host vehicle having the object detection apparatus of the present invention installed thereon and shown on a three lane road in which the host vehicle is passing cars in an adjacent lane.

Referring first to FIG. 1, the object detection apparatus of the present invention may be installed on a host vehicle 10 for the purpose of alerting the vehicle's driver of the presence of an object, such as an adjacent car, within an area under surveillance. In the application illustrated in FIG. 1, the object detection apparatus includes a detection unit 18 mounted on each rear corner of the vehicle 10, in or near the tail lights thereof. Alternatively, the detection units 18 may be mounted on the vehicle's license plate bracket or inside the vehicle 10, in front of the rear window thereof. Each of the detection units 18 emits a fan-shaped beam 12 of light energy in the infrared region, and preferably at a wavelength of approximately 850 to 980 nanometers. The beam 12 diverges at approximately a 25 degree angle and has its center line 14 positioned approximately 45 degrees from an axis 16 which extends parallel to the vehicle's path of travel and through the corresponding detection unit. The effective area under surveillance by the detection units 18 is indicated within the broken line 15. It may thus be appreciated from FIG. 1 that the area 15 under surveillance constitutes a potential "blind spot" which the driver has difficulty viewing, either by use of rear view mirrors or by turning his head. The use of the object detection apparatus of the present invention as a detector for vehicles that monitors a zone of potential contact is particularly well-suited to assist the driver in changing lanes while traveling in multiple lane traffic. The apparatus is designed to alert the driver of the host vehicle 10 by means of a visual and/or audible signal when another car enters the area 15 under surveillance which may be considered a "zone of potential contact". Ideally, both an audible and a visual alarm are provided in the passenger compartment to alert the driver of the presence of an object within the monitored areas. The volume of the audible alarm is preferably adjustable by the driver. In a first mode of operation, both the audible and visual alarms are activated when an object is detected within the monitored area, although the driver may disable the audible alarm by fully decreasing its volume. In a second mode of operation which is initiated when the driver activates his turn signal, the audible alarm is activated at full volume regardless of the volume setting level, and the visual alarm is also activated when an object is detected; in this manner, the driver is provided with an alarm to ensure that he or she does not change lanes until cars in the adjacent lane into which the driver is turning are at a safe passing distance. In addition to assisting the driver in executing a passing maneuver, the object detector of the present invention alerts the driver of the host vehicle 10 when an adjacent vehicle passes or is in the process of passing the host vehicle 10.

Figure 2:
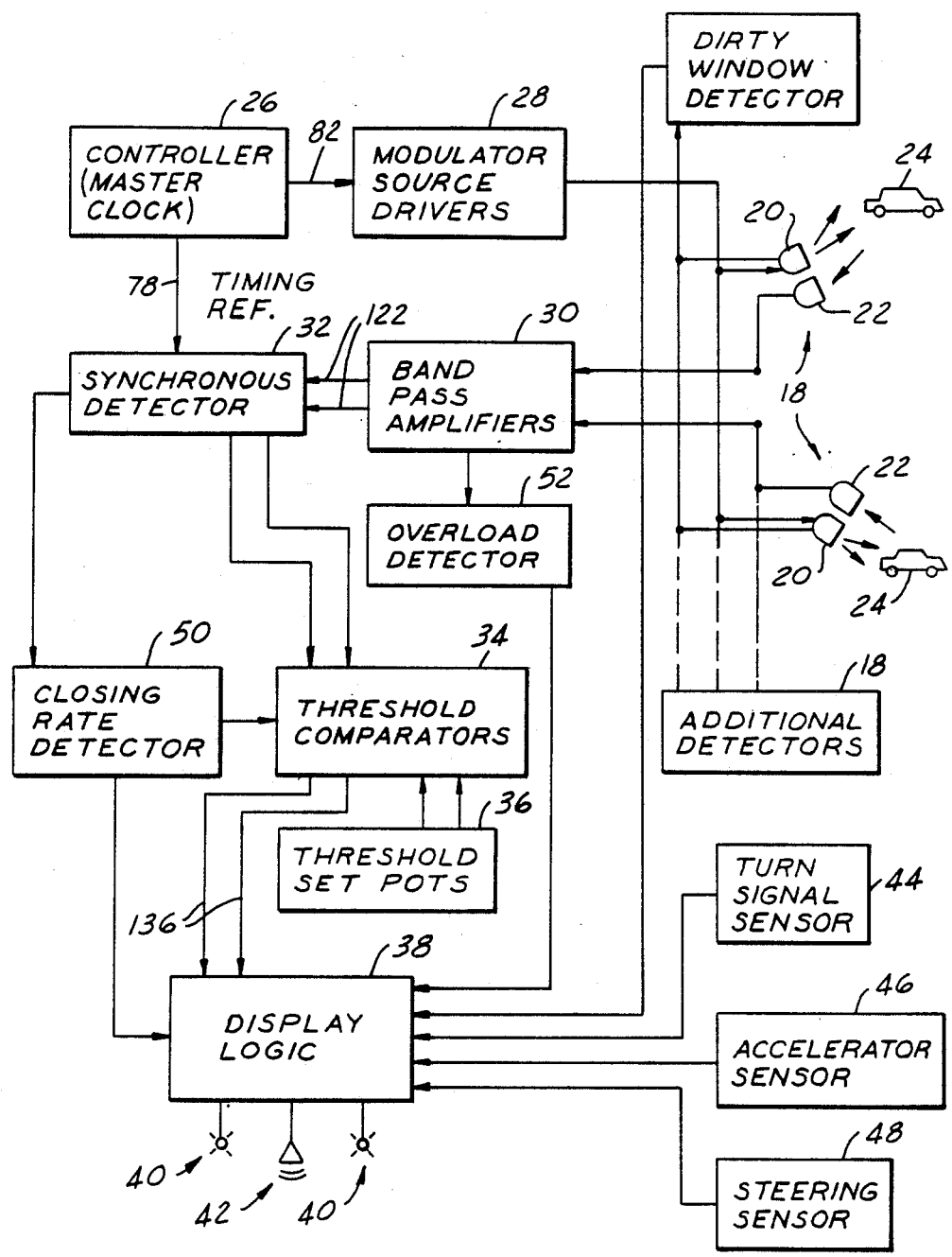
FIG. 2 is a broad block diagram of the object detection apparatus which forms the preferred embodiment of the present invention.
Figure 3:
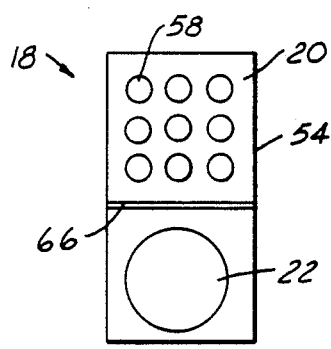
FIG. 3 is an elevational view of the front of a detector unit which includes the emitter and receiver portions of the detection apparatus.
Figure 4:
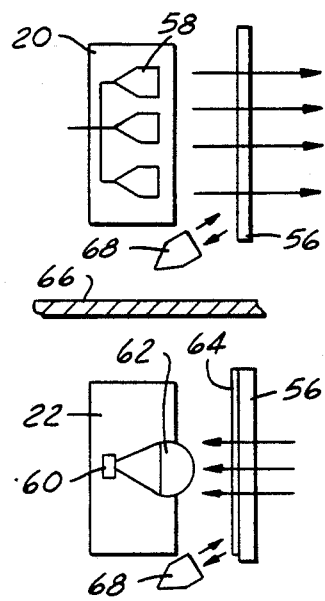
FIG. 4 is a diagrammatic view showing the relationship between the emitter and receiver portions of the unit shown in FIG. 3.

Attention is now directed to FIG. 2 which depicts the basic components of the object detection apparatus described above with reference to FIG. 1. A detection unit 18 is mounted on each rear corner of the vehicle 10 and is positioned so as to monitor an area several degrees on each side of a center line extending roughly 45 degrees from the path of travel of the vehicle 10, as discussed in FIG. 1 above. Referring now also momentarily to FIGS. 3 and 4, each of the units 18 includes an emitter portion 20 and a receiver portion 22 preferably mounted in a common, light tight housing 54 and separated by a barrier 66 of suitable opaque material which prevents optical communication between the emitter portion 20 and receiver portion 22. The emitter portion 20 and receiver portion 22 are covered by an outer shield 56 of material which is transparent to the wavelength of light of interest. The shield 56 may comprise two component parts, as shown in FIG. 4, or may be a single unit which covers the entire face of the housing 54.

The emitter portion 20 comprises a plurality of electro-optical infrared emitters 58 which will be discussed later in more detail. The emitters 58 are preferably arranged in an array which, in FIG. 3, is shown as three rows of three columns.

The receiver portion 22 of the detector unit 18 includes a photosensitive semiconductor element 60 such as PIN photodiode which will be discussed later in more detail. The photosensitive device 60 is sensitive to light energy within a preselected band of wavelengths, for example, between 750 and 1100 nanometers, and functions to convert the received light energy impinging thereon into an electrical signal which varies in accordance with the magnitude of received light energy. Light passing through the shield 56 and a filter 64 are focused on the photoresponsive element 60 by means of an aspherical optical lens 62. The filter 64 may comprise a conventional optical filter which substantially attenuates light energy outside a preselected wavelength. For example, the filter 64 may be selected to provide a peak response at a wavelength corresponding to that of the light energy emitted by emitters 58.

As one feature of the invention, means are provided to detect the presence of an accumulation of foreign matter on the exterior of the shields 56. This foreign matter may consist of moisture, ice or other particulate matter which adhere to the face of the shield 56 and reduces the amount of light energy picked up by the receiver portion 22. This additional detection means is in the form of an optical pick-up 68 which is mounted within the housing 54 and is oriented so as to optically sense the presence of accumulations on the shields 56. The optical pick-up 68 will be discussed later in more detail.

Referring now particularly to FIG. 2, the emitter portions 20 of the detection units are driven by a controller 26 and modulator source drivers 28. The controller 26 functions as a master clock which produces a clock signal at a preselected frequency. It has been found that a frequency of at least between 50 and 60 KHz, and preferably 56 KHz provides optimum results. This clock signal is used to modulate the source drivers 28 which in turn drive the emitter portions 20. The light energy at the preselected wavelength emanating from the emitters 58 is therefore modulated at the preselected clock frequency of the controller 26. Modulation at this particular frequency substantially reduces the possibility of interference in the system due to quick flashes of light that may be received by the receiver portion 22 which may be picked up from background sunlight and shadows. The preselected modulation frequency also acts as a signature which is keyed into the emitted light energy which can later be recognized and processed by the receiver portion.

Light reflected from an object 24 is received by the receiver portion 22. As previously mentioned, a conventional optical filter 64 functions to attenuate light energy outside a particular, preselected wavelength or range of wavelengths. The filtered light energy is converted to an electrical signal which is delivered on lines 100 to a band-pass amplifier 30. The band-pass amplifier 30 is tuned to the frequency of the controller 26 and functions to amplify signals having a frequency within a preselected range of the clock frequency provided by the controller 26. Thus, the band-pass amplifier 30 functions as a first level discriminator to select from the complex waveform input signal those signal components having the characteristic signature frequency of the controller 26.

The outputs of the band-pass amplifier 30 are delivered on lines 122 to a synchronous detector 32. The synchronous detector 32 receives a timing reference signal 78 from the controller 26 which is identical to that delivered on line 82 to the modulator source drivers 28. The synchronous detector 32 functions to sample the amplified signal received on lines 122 at the rate or frequency of the clock signal on line 78. The synchronous detector 32 thus forms a second level discriminator which more precisely excises that portion of the received complex waveform signal which includes the signature frequency of the controller 26.

The outputs of the synchronous detector 32 are a pair of signals whose magnitude is proportional to the quantity of reflected light energy respectively received by the receiver portions 22 and which originated from the corresponding emitter portions 20. These output signals are delivered to a pair of threshold comparators 34 which compare the magnitude of the input signals with corresponding threshold values which may be adjusted by means of threshold pots 36. In the event that the magnitude of either of the signals applied by the synchronous detector 32 exceed the threshold values, a corresponding alarm signal is delivered on either or both of the lines 136 to display logic 38. Display logic 38 is responsive to these latter-mentioned signals to enable one or more lights 40 and/or an audio device 42, thereby to alert the driver that an object 24 has been detected. The threshold pots 36 effectively provide a means for adjusting the sensitivity of the detection system, and thus the range or distance that the detection units 18 are effective to detect the object 24.

An optional overload detector 52 may be provided to sense the condition in which either of the amplified signals produced by the amplifier 30 exceed a preselected value which indicated that the receiving portions 22 are temporarily "blinded" by an overload condition (e.g. intense sunlight). In the event of such an overload condition, the overload detector 52 delivers a signal to the display logic 38 which results in the activation of an additional alarm annunciator (not shown) dedicated to announcing such overload.

Additional detection units 18 may be provided at different positions on the vehicle 10 in order to sense the rate at which an adjacent vehicle is being passed. By using multiple sets of detection units 18 wherein at least two contiguous or overlapping beams are provided on each side of the vehicle, it is possible to create patterns of reflected signals which may be deciphered by an optional closing rate detector 50 to determine whether the host vehicle 10 is getting closer or farther away from an adjacent vehicle or object. Moreover, when two contiguous or overlapping beams are employed, the closing rate detector 50 can employ complex algorithms which can determine whether an adjacent vehicle is closing on the host vehicle in a longitudinal direction (parallel to the host vehicle) or in a radial or azimuthal direction (changing lanes). The closing rate detector 50 is driven by an output of the synchronous detector 32 and functions either through hardware or software to detect a steady increase in the incoming reflection signal. The closing rate detector 50 may function as a second threshold detector which compares the signal from the synchronous detector and activates a suitable alarm (not shown) through the display logic 38 when the detected object has "closed" to a preselected distance from the host vehicle 10.

Figure 5:
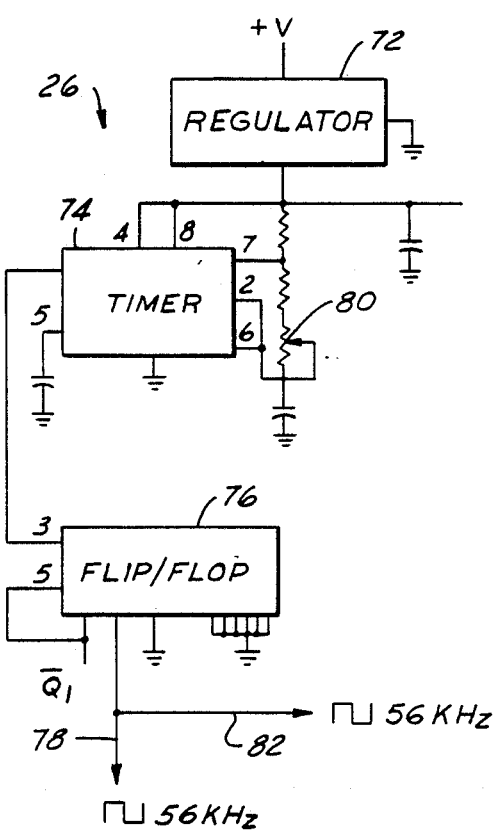
FIG. 5 is a detailed schematic diagram of the controller shown in FIG. 2.

Attention is now directed to FIG. 5 which depicts the details of the controller 26. As previously indicated, the controller 26 functions to produce a modulating clock signal which turns the emitters 58 on and off at a preselected frequency. Based on computer modeling, a frequency of 56 KHz has been found to be a sufficiently high frequency to provide optimum discrimination against background sunlight and light from other sources. The controller 26 may be implemented either through software or by hardware as shown in FIG. 5 to generate the 56 KHz square wave, preferably with a stability of less than or equal to +/−0.2%. The controller 26 includes a timer chip 74 such as an LM555CN microcircuit which is driven by a suitable source of voltage regulated by a voltage regulator 72. The exact frequency of the timer 74 may be adjusted using a potentiometer 80. A 112 KHz clock signal is output to a flip-flop 76 which acts as a divider to generate 50 percent duty cycle complementary clock signals which are output as a 56 KHz digital square wave on lines 78 and 82 respectively to the synchronous detector 32 and modulator source drivers 28 (FIG. 2).

Figure 6:
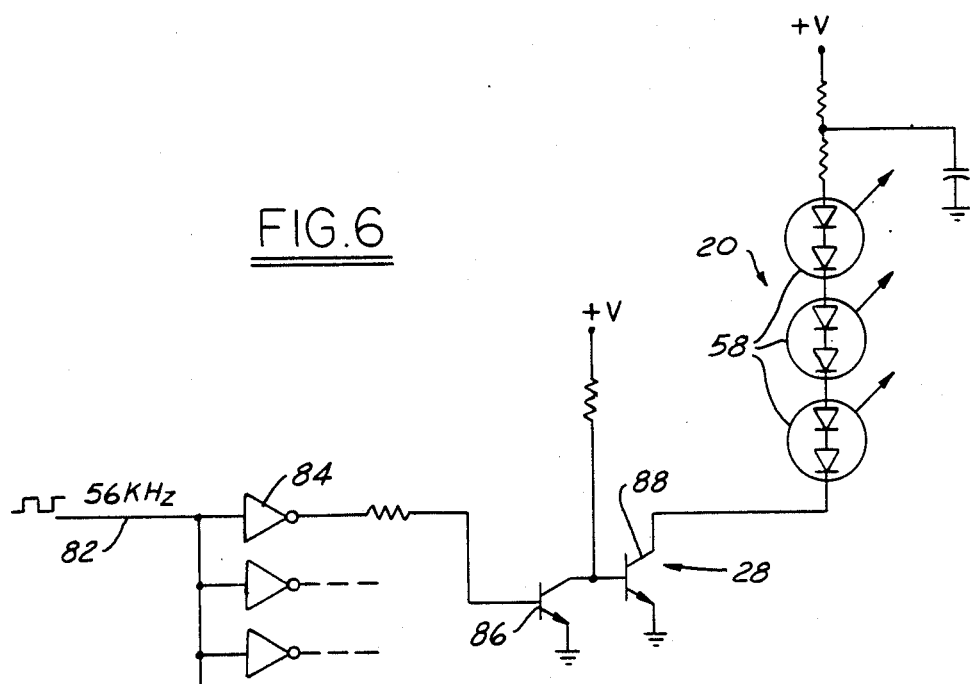
FIG. 6 is a detailed schematic diagram showing one of the modulator source drivers and one set of corresponding emitters depicted in FIG. 2.

The details of one of the modulator source drivers 28 and a corresponding set of emitters 58 is shown in FIG. 6. The 56 KHz signal received on line 82 is inverted by an inverter 84 and is used to drive the base of an NPN power transistor 86, which in turn controls an NPN power transistor 88. The output of each of the drivers 28 is delivered as a modulating current signal to a corresponding set of three series connected emitters 58 which form a portion of the emitter unit 20. The emitters 58 may comprise, for example, Siemens LD273 light emitting diodes which are positioned closely together and have a nominal 100 mA peak driver current. The rated emission in the center of the output beam 12 (FIG. 1) of the emitter portion 20 is 270 mW-steradian at a wavelength of 950 nanometers. The resulting beam 12 has a nominal 15 degree vertical dispersion and 25 degree horizontal dispersion. Rated switching time for emitters 58 is approximately one microsecond and actual on and off times are each approximately 9 microseconds. As previously mentioned, the emitters 58 are arranged in a three-by-three array, with each side of the array extending approximately one-half inch. The array of emitters 58 may be separated from the receiver portion 22 (FIG. 3) by approximately four inches. The five remaining drivers 28 and sets of emitters 58 are identical in detail to the single circuit shown in FIG. 6.

Figure 7:
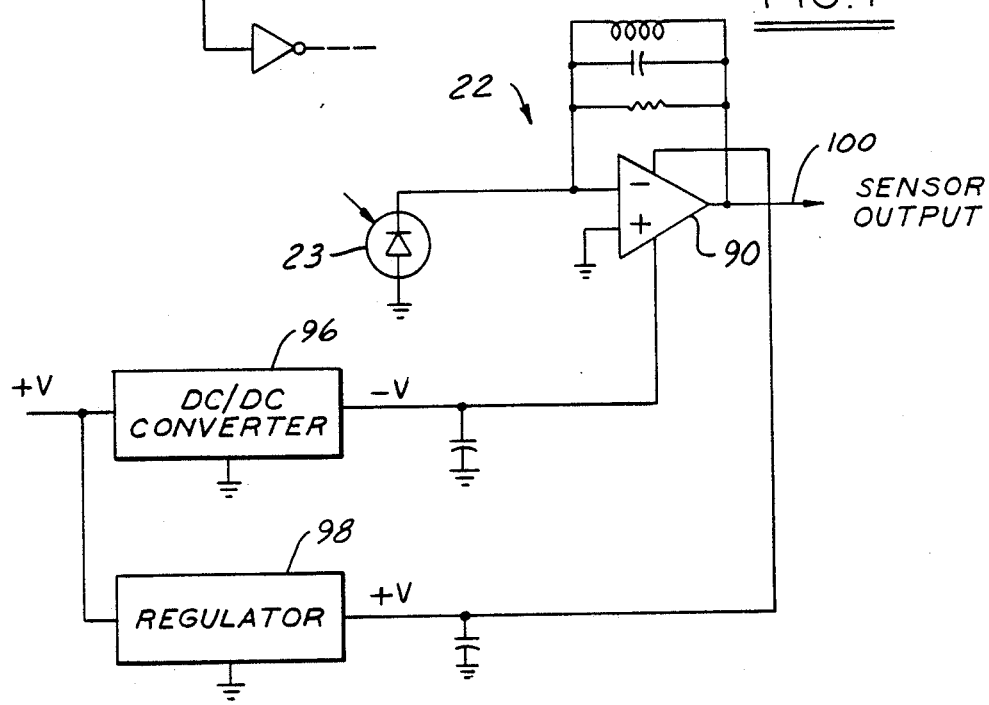
FIG. 7 is a combined block and detailed schematic diagram of the receiver portion shown in FIG. 2.

Attention is now directed to FIG. 7 which depicts the details of one of the receiver portions 20 of the detection unit 18. The receiver portion 22 includes a silicon PIN photodiode 23 which may comprise a Siemens SFH205 device onto which received light energy is focused by the previously mentioned aspheric optical lens 62 (FIG. 4). The previously mentioned filter 64 may be defined by an infrared transmitting plastic which encases the photodiode 23 and functions to block radiation below 800 nanometers wavelength and provides a peak response at 950 nanometers. The filter 64 functions to effectively reject the flickering light from mercury vapor street lights, etc. and reduces the photodiode's sensitivity to sunlight. The output of the photodiode 23 is delivered to the inverting input of an op-amp 90 which functions as a pre-amplifier. Power is supplied to the operational amplifier 90 by a DC/DC converter 96 and decoupling of electrical noise on the input power line is accomplished through a regulator 98. The output of the op-amp 90 is a DC-coupled signal having an approximately 150 KHz high frequency cut-off and is proportional in magnitude to the quality of light energy received by the photodiode 23. An inductor used in combination with a resistor and a capacitor in the feedback circuit of amplifier 90 can be used to selectively amplify the desired frequency band and reduce the effect of sunlight.

Figure 8:
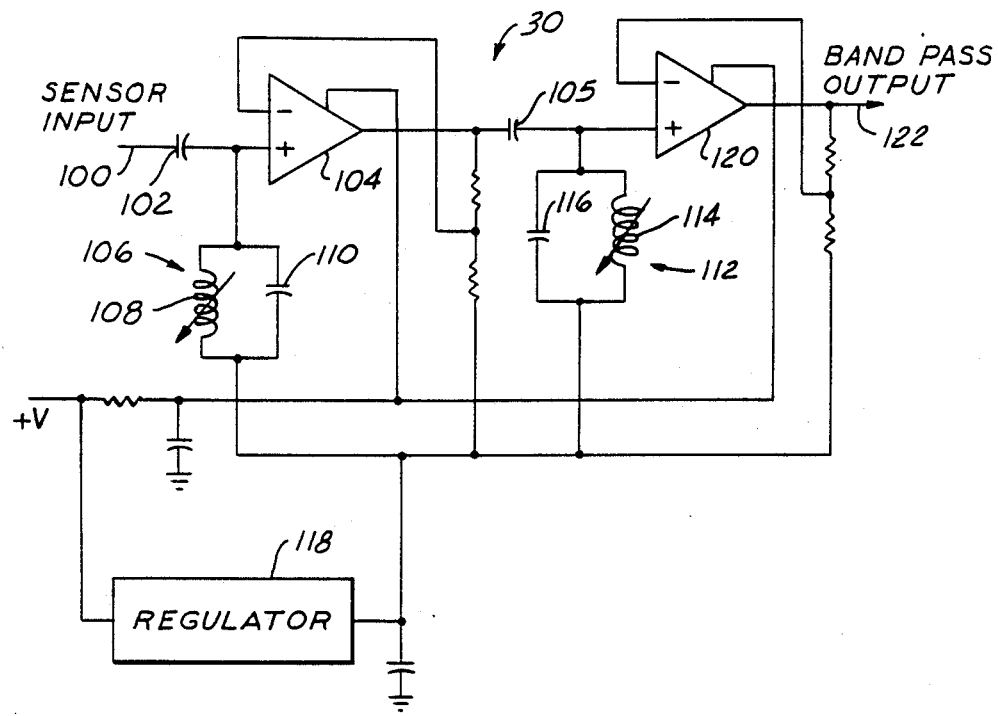
FIG. 8 is a detailed schematic diagram of the bandpass amplifier shown in FIG. 2.

The output signal from op-amp 90 is delivered on line 100 to the input of a corresponding band-pass amplifier 30, the details of one of which are depicted in FIG. 8. The input signal on line 100 is coupled via capacitor 102 to the non-inverting input of an op-amp 104 and to an LC network 106 consisting of a capacitor 110 in parallel with an adjustable band-pass coil 108. The output of the op-amp 104 is coupled via capacitor 105 to the non-inverting input of a second op-amp 120 as well as to a second LC network 112 consisting of a capacitor 116 in parallel with an adjustable band-pass coil 114. Regulated power to the amplifier is provided through a voltage regulator 118. The LC networks 106 and 112, in combination with op-amps 104 and 120, form two tuned stages, each used as a detector and each having a bandwidth of +/- approximately 1 KHz for each stage with zero phase shift at the center frequency. The total peak gain provided by both stages is approximately 2000 at 56 KHz with a 3 db bandwidth of 500 Hz.

Figure 9:
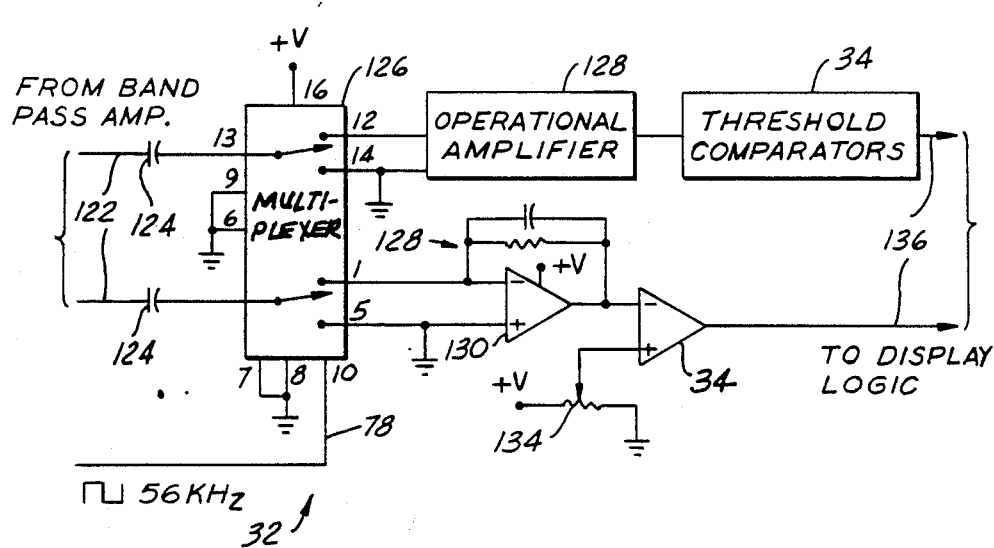
FIG. 9 is a combined block and detailed schematic diagram depicting the synchronous detector and threshold comparators shown in FIG. 2.

Attention is now directed to FIG. 9 wherein the details of the synchronous detector 32 are depicted. The inputs from the band-pass amplifiers 30 associated with detection units 18 are coupled by capacitors 124 to the inputs of an analog multiplexer which may comprise, for example, a CD4052A microcircuit. Pin 10 of the multiplexer 126 receives the 56 KHz timing reference via line 78. The multiplexer 126 is driven by the timing reference signal to operate as a phase detector which operates to isolate the incoming signals on line 122 that result from light reflected from the object 24 which originates from the emitters 58. This signal is amplified and averaged by amplifier 128 to give a DC signal having a response time of 0.05 seconds and is respectively delivered to a pair of corresponding, identical comparator circuits 34, one of the comparator circuits 34 being shown in detail, the other being depicted in a block form.

The inputs to the multiplexer 126 on lines 122 are respectively switched between two sets of output lines which are connected to the inverting and non-inverting input terminals of an operational amplifier 130. This switching is performed at the 56 KHz rate of the controller 26. Since the non-inverting input of op-amp 130 is connected to circuit common, the output of op-amp 130 is a measure of detected light in synchronism with the emitted light. In the event that the incoming signal does not correspond to the modulation frequency spectrum (e.g. background radiant with a wide frequency spectrum), then the average value summed by the op-amp 130 is zero. However, if the incoming signal is synchronized with the emitted light energy from the detection units 18, then op-amp 130 provides an output to the inverting input of the threshold comparator 34. The threshold comparator 34 compares the value on its inverting input with a value on its non-inverting input established by a potentiometer 134. If the threshold value is exceeded, a signal is output on the corresponding line 136 to the display logic 38, thereby resulting in the activation of one or more alarms.

Referring now again to FIG. 2, the display logic 38 may receive activating signals from a turn signal sensor 44, an accelerator sensor 46, or a steering sensor 48 which are employed to selectively enable the alarm outputs 40, 42. For example, any of these latter-mentioned input signals can be used as an indication that the host vehicle 10 is commencing a passing maneuver, in which case the audio alarm 42, for example, is activated as long as the presence of an object 24 is detected within the area under surveillance.

The previously discussed dirty window detector 68 may comprise a system identical to the primary detection system previously described, but with decreased gain and a higher detection threshold.

In order to avoid interference between a number of vehicles, each of which uses the object detection system of the present invention, a keyed modulation technique may be employed. In such a technique, the controller 26 would employ any suitable means (such as computer software) to vary the frequency of modulation of the emitted light energy. The modulation frequency would be varied in accordance with a "key" unique to each vehicle and would appear to be "random" to the receivers of other vehicles. The receiver of each vehicle equipped with the detection system would include a correlation detector capable of detecting only the reflected signal having the keyed modulation frequency which is unique to that vehicle.

Figure 10:
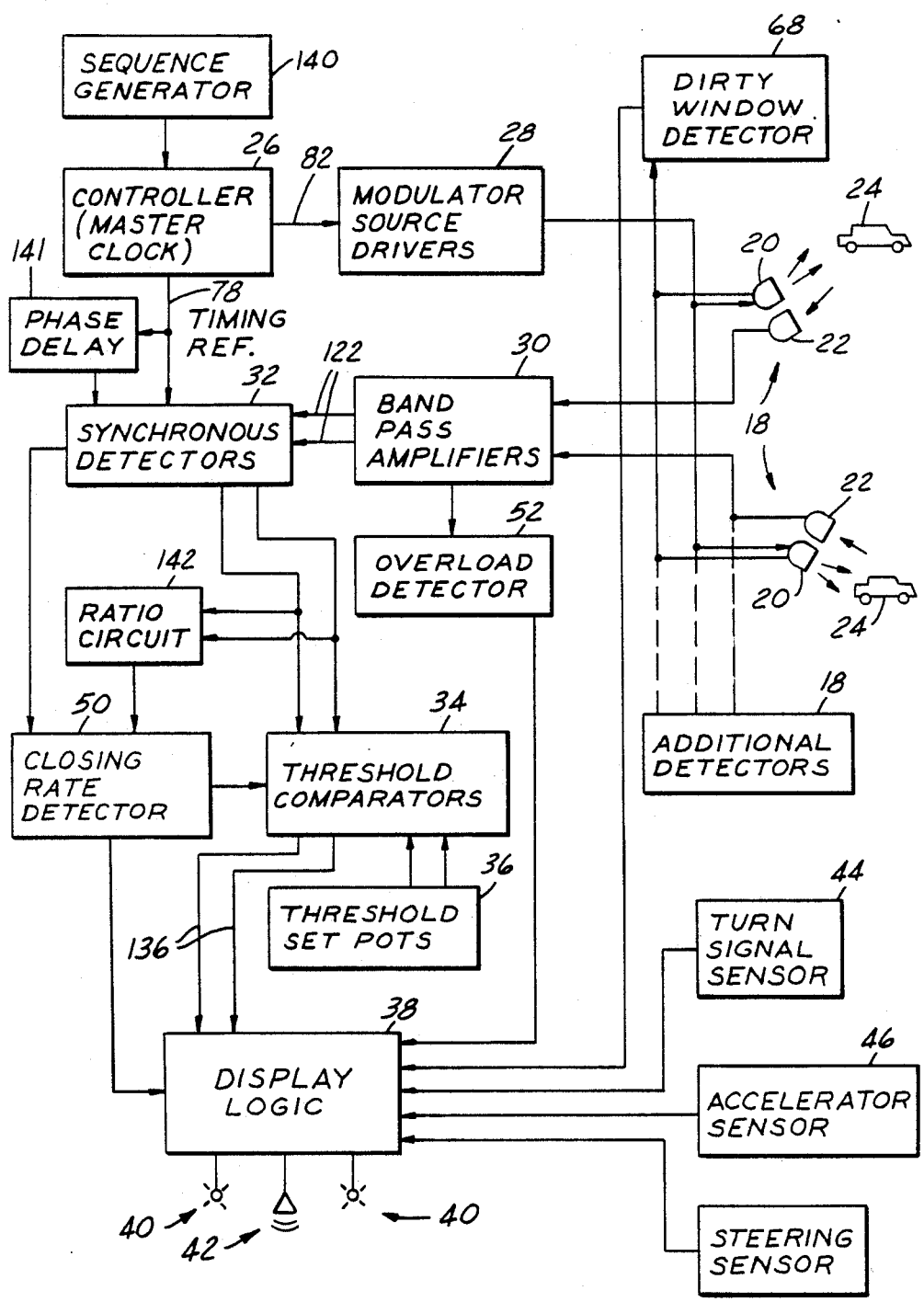
FIG. 10 is a block diagram of an alternate embodiment of the object detection apparatus of the invention.

FIG. 10 shows an alternate embodiment of the present invention which includes a modification to the circuit of FIG. 2 for achieving this keyed modulation technique. Thus, a sequence generator 140 is connected to controller 26 for providing a sequence of modulating frequencies which provide a characteristic "key" for a particular unit. Controller 26 is modified to provide variable frequency clock signals under the control of sequence generator 140. The activating signal provided on lines 82 and 78 has a frequency spectrum which can either contain one component frequency or a plurality of frequencies.

In operation, sequence generator 140 changes the modulation frequency (or frequencies) of controller 26 at predetermined intervals. Sequence generator 140 is a device which is well known in the art and may comprise, for example, a read only memory (not shown) for periodically commanding a new modulation frequency to controller 26. Each detection unit could then be provided a unique frequency sequence in its read only memory to avoid interference with other systems on adjacent vehicles. Alternatively, each vehicle could be equipped with a random sequence generator also of conventional design known in the art, (e.g. a plurality of shift registers and combinational logic) for generating a random sequence of frequencies.

In the case that the activating signal is provided with simultaneous modulation frequencies (i.e. has a frequency spectrum having more than one component frequency), it may be desirable for the activating signal and emitters 20 to have an intermediate level wherein the emitter generates emission at an intermediate level (e.g. a half-power level). This will simplify modulation at a plurality of frequencies.

A further improvement to the system of FIG. 10 is achieved by means of a phase delay circuit 141 and a ratio circuit 142. Phase delay circuit 141 receives the square wave signal from line 78 to provide a quadrature signal which is phase shifted by 90° from the timing reference signal. The output from band pass amplifiers 30 is synchronously detected according to this phase delayed signal to improve the selectivity of the system. The output of the phase delayed synchronous detector will be zero in the presence of normal background and the usual emitted signal by the system. The output from the phase delayed synchronous detector will not be zero when either the detected light is not a reflection of the light from the emitters 20 but is from another source (such as a similar system on another car) or when the reflecting object is far enough away to introduce a significant delay due to the time of flight of the light on its path from the emitters to the object and back to the detectors. When the quadrature (i.e. phase delayed) synchronous output exceeds a predetermined value, then the output from the normal synchronous detector should be disregarded. Ratio circuit 142 sets this predetermined value at a specific ratio of the present output from the normal synchronous detector. The output signal from ratio circuit 142 can be used to inhibit indication of an object by the display logic or can be used to alter the frequency sequence generated by frequency generator 140 to avoid the interference from a nearby system.

If the basic modulating frequencies being used are increased to be in the range of 1 to 10 mHz, it is possible to reject objects which are beyond a predetermined distance. For example, using a 5 megahertz operating frequency, light reflected from an object at 12.5 feet will be delayed by 25 nanoseconds, and will be seen with a 45° phase shift. In this case, the 90° phase shift detector output will equal that of the normal detector. This condition can be used to inhibit response to objects beyond 12.5 feet, or any other selected distance. Furthermore, the ratio between the phase shifted detector output and the synchronous detector output can be employed to find the distance to an object.

Referring now to FIG. 11, a modification to controller 26 for providing phase delay 141 is shown which includes an exclusive OR gate 145. The inputs of gate 145 are connected to line 82 having the base 56 kilohertz signal and to the output of timer circuit 74 having a 112 kilohertz clock signal. The output of gate 145 is therefore a 56 kilohertz signal phase delayed by 90°.

The phase delayed quadrature signal is provided to a quadrature synchronous detector shown in FIG. 12, including a multiplexer 126 and an op-amp 128. Also input to the quadrature detector is the normal synchronous detector input from the band pass amplifier 30. The output of the quadrature synchronous detector is provided on line 146 to one input of a comparator 148. The output signal from the normal synchronous detector is provided to the other input of comparator 148 through a potentiometer 147. The signal on line 146 is inverted by an inverter 149 and provided to one input of another comparator 150. The remaining input of comparator 150 is connected to the output of potentiometer 147. The outputs of comparators 148 and 150 are connected to respective inputs of a NAND gate 151. In operation, the comparators 150 and 148 indicate whether the absolute value of the quadrature output signal on line 146 exceeds a predetermined ratio of the normal synchronous detector output determined by potentiometer 147. The output of NAND gate 151 controls a transmission gate 152 coupled to the output from the normal synchronous detector. Thus, when the predetermined ratio is exceeded by the quadrature signal, then the output from the normal synchronous detector is inhibited by turning off transmission gate 152. It may also be desirable to alter the frequency sequence from sequence generator 140 in response to the output from gate 151.

A further improvement to the present invention will now be described with reference to FIG. 13. A single detector can be arranged to receive light emitted by more than one emitter. In the embodiment shown in FIG. 13, a pair of emitters designated A and B emit angularly segregated beams from a first location on a vehicle. A pair of detectors C and D are at another location on the vehicle and are adapted to receive light in a plurality of channels, each channel being adapted to receive light from a respective zone. As shown, the receiving zones of the detectors include a plurality of segregated beams from the emitters. Thus, detector C can receive reflected light in areas designated AC and BC. Likewise, detector D can receive light reflected from areas AD and BD. The beams from emitters A and B must be either multiplexed or modulated so that the detector can distinguish between light from each beam. For example, beams from emitters A and B can be sequentially emitted in order to distinguish between beams. Alternatively, beams can be emitted simultaneously by emitters A and B with different frequency spectrums. Implementation of a system having isolation of these optical intersection zones requires a plurality of channels within the system as described previously.

Having thus described several embodiments of the invention, it is recognized that those skilled in the art may make various modifications and additions to the preferred embodiment chosen to illustrate the invention without departing from the spirit and scope of the present contribution to the art. For example, the emitters 58 could be pulse modulated at a preselected frequency, rather than continuously modulated, and the magnitude could be sampled at the modulation frequency to determine whether the emitted pulses are present therein. Accordingly, it is to be understood that the protection sought and to be afforded hereby shall be deemed to extend to the subject matter claimed and all equivalence thereof fairly within the scope of the invention.

What is claimed is:

1. Apparatus for detecting the presence of an object in an area under surveillance comprising:
   emitter means for emitting light into said area;
   controller means coupled to said emitter means for generating an activating signal to control the intensity of said light such that said intensity has a keyed modulation;
   detector means for receiving light from said area and generating an electrical signal proportional thereto, said electrical signal having said keyed modulation;
   synchronous means coupled to said detector means and to said controller means for deriving a first portion of said electrical signal having said keyed modulation;
   threshold means coupled to said synchronous means for generating an indicating signal when the magnitude of said first portion exceeds a threshold value;
   delay means coupled to said controller means for generating a quadrature signal phase shifted by substantially 90° from said activating signal;
   quadrature means coupled to said detector means and to said delay means for deriving a second portion of said electrical signal having a modulation corresponding to said quadrature signal; and
   circuit means coupled to said quadrature means and to said synchronous means for comparing said first portion and said second portion.

2. The apparatus of claim 1 wherein said circuit means is further coupled to said threshold means for inhibiting said indicating signal when the absolute value of said second portion exceeds a predetermined ratio of said first portion.

3. A method for detecting the presence of an object within an area under surveillance comprising the steps of:
   radiating light energy into said area, said energy having an intensity corresponding to a selected modulation;
   receiving light energy from said area including said radiated light energy and generating an electrical signal proportional thereto;
   deriving a first portion of said electrical signal corresponding to said selected modulation;
   indicating the presence of an object when said first portion exceeds a threshold value;
   generating a quadrature signal phase-shifted by substantially 90° from the modulation of said intensity;
   deriving a second portion of said electrical signal corresponding to said quadrature signal; and,
   inhibiting said indicating step when said second portion exceeds a predetermined value.

4. The method of claim 3 further comprising the step of varying said selected modulation over time.

5. The method of claim 4 wherein said selected modulation is frequency modulation having substantially only one frequency component.

6. The method of claim 4 wherein said selected modulation is frequency modulation having a plurality of frequency components.

7. The method of claim 3 further comprising the step of generating a predetermined ratio of said first portion as said predetermined value.

8. The method of claim 3 wherein said radiating step includes generating a plurality of angularly segregated light beams.

9. The method of claim 8 wherein said receiving step includes separate detection of each of said light beams.

10. The method of claim 8 wherein each of said light beams has a different selected modulation.

11. The method of claim 8 wherein said light beams are emitted in sequence.

12. Apparatus for detecting the presence of an object within an area under surveillance, comprising:
    emitter means for emitting radiant energy into said area;
    controller means coupled to said emitter means for generating an activating signal to control the intensity of said radiant energy such that said intensity has a controlled frequency spectrum;
    detector means for receiving radiant energy from said area and generating an electrical signal proportional thereto;
    synchronous means coupled to said detector means and to said controller means for deriving a first portion of said electrical signal having said controlled frequency spectrum;
    threshold means coupled to said synchronous means for generating an indicating signal when the magnitude of said first portion exceeds a threshold value; and,
    key sequence generator means coupled to said controller means for sequentially commanding said frequency spectrum, said key sequence generator means including a read-only memory for sequentially reading out a commanded frequency spectrum.

13. The apparatus of claim 12 wherein said controlled frequency spectrum is time varying.

14. The apparatus of claim 12 wherein said controlled frequency spectrum has substantially only one component frequency, the frequency of which varies in time.

15. The apparatus of claim 12 wherein said controlled frequency spectrum has more than one component frequency.

16. The apparatus of claim 12 wherein said emitter means is adapted to emit a plurality of angularly segregated beams of said radiant energy.

17. The apparatus of claim 16 wherein each of said plurality of beams has a different controlled frequency spectrum.

18. The apparatus of claim 16 wherein said plurality of beams are emitted in sequence.

19. The apparatus of claim 16 wherein said detector means includes a plurality of channels, each channel adapted to receive radiant energy from a respective zone within said area.

20. Apparatus for detecting the presence of an object within an areas under surveillance, comprising:
    emitter means for emitting radiant energy into said area;
    controller means coupled to said emitter means for generating an activating signal to control the intensity of said radiant energy such that said intensity has a controlled frequency spectrum;
    detector means for receiving radiant energy from said area and generating an electrical signal proportional thereto;

synchronous means coupled to said detector means and to said controller means for deriving a first portion of said electrical signal having said controlled frequency spectrum;

threshold means coupled to said synchronous means for generating an indicating signal when the magnitude of said first portion exceeds a threshold value;

delay means coupled to said controller means for generating a quadrature signal phase-shifted by substantially 90° from said activating signal;

quadrature means coupled to said detector means and to said delay means for deriving a second portion of said electrical signal which has a frequency spectrum phase-shifted by substantially 90° from said activating signal; and, circuit means coupled to said quadrature means and to said threshold means for inhibiting said indicating signal when the absolute value of said second portion exceeds a predetermined value.

21. The apparatus of claim 20 wherein said predetermined value is a predetermined ratio of said first portion.

* * * * *